United States Patent [19]
Irvin

[11] Patent Number: 5,973,476
[45] Date of Patent: Oct. 26, 1999

[54] BATTERY PACKS INCLUDING RECHARGEABLE AND NON-RECHARGEABLE BATTERIES AND RELATED SYSTEMS AND METHODS

[75] Inventor: David R. Irvin, Raleigh, N.C.

[73] Assignee: Ericsson Inc., Research Triangle Park, N.C.

[21] Appl. No.: 08/890,178

[22] Filed: Jul. 9, 1997

[51] Int. Cl.⁶ .................................................. H02J 7/00
[52] U.S. Cl. ........................ 320/112; 320/114; 320/125; 320/126; 429/97; 307/150
[58] Field of Search ................... 320/135, 136, 320/127, 128, 118, 107, 112, 114, 125, 126, 124; 429/96, 97, 98, 99, 100; 307/65, 66, 149, 150

[56] References Cited

U.S. PATENT DOCUMENTS

| | | | |
|---|---|---|---|
| 106,388 | 8/1870 | McCracken | 320/112 |
| 977,721 | 12/1910 | Everett | 320/112 |
| 1,875,956 | 4/1932 | Thiel | 320/112 |
| 1,913,696 | 11/1933 | Wiley et al. | 320/112 |
| 4,084,123 | 4/1978 | Lineback et al. | 320/2 |
| 4,140,957 | 2/1979 | Rapp . | |
| 4,667,142 | 5/1987 | Butler | 320/6 |
| 4,694,237 | 9/1987 | Hanson | 320/6 |
| 4,818,928 | 4/1989 | Schosser | 320/112 |
| 4,829,224 | 5/1989 | Gandelman et al. | 320/2 |
| 4,851,756 | 7/1989 | Schaller et al. . | |
| 5,036,532 | 7/1991 | Metroka et al. | 379/58 |
| 5,136,229 | 8/1992 | Galvin | 320/2 |
| 5,148,042 | 9/1992 | Nakazoe | 307/65 |
| 5,162,719 | 11/1992 | Tomura et al. | 320/2 |
| 5,189,358 | 2/1993 | Tomura et al. | 320/2 |
| 5,200,685 | 4/1993 | Sakamoto | 320/2 |
| 5,254,927 | 10/1993 | Chiang | 320/2 |
| 5,300,874 | 4/1994 | Shimamoto et al. | 320/15 |
| 5,309,031 | 5/1994 | Stewart et al. | 307/66 |
| 5,331,212 | 7/1994 | Johnson-Williams et al. . | |
| 5,418,433 | 5/1995 | Nilssen | 315/175 |
| 5,422,558 | 6/1995 | Stewart | 320/7 |
| 5,477,123 | 12/1995 | Allen et al. | 320/2 |
| 5,485,073 | 1/1996 | Kasashima et al. . | |
| 5,545,935 | 8/1996 | Stewart | 307/150 |
| 5,610,497 | 3/1997 | Croughwell | 320/15 |
| 5,793,187 | 8/1998 | DeBauche . | |

FOREIGN PATENT DOCUMENTS

| | | | |
|---|---|---|---|
| 0 434 905 A2 | 9/1990 | European Pat. Off. | G06F 1/26 |
| 4-105524 | 4/1992 | Japan | H02J 7/34 |

*Primary Examiner*—Peter S. Wong
*Assistant Examiner*—K. Shin
*Attorney, Agent, or Firm*—Myers Bigel Sibley & Sajovec

[57] ABSTRACT

A battery pack for an electronic device includes a housing separate from the electronic device wherein the housing can be mechanically connected to the electronic device. Electrical contacts on the housing provide electrical contact with the electronic device when connected thereto. A first battery interface in the housing receives a first battery, and a second battery interface in the housing receives a second battery. A switch in the housing connects either the first battery interface or the second battery interface to the electrical contacts in response to a selection by a user of the electronic device. Related systems and methods are also discussed.

36 Claims, 3 Drawing Sheets

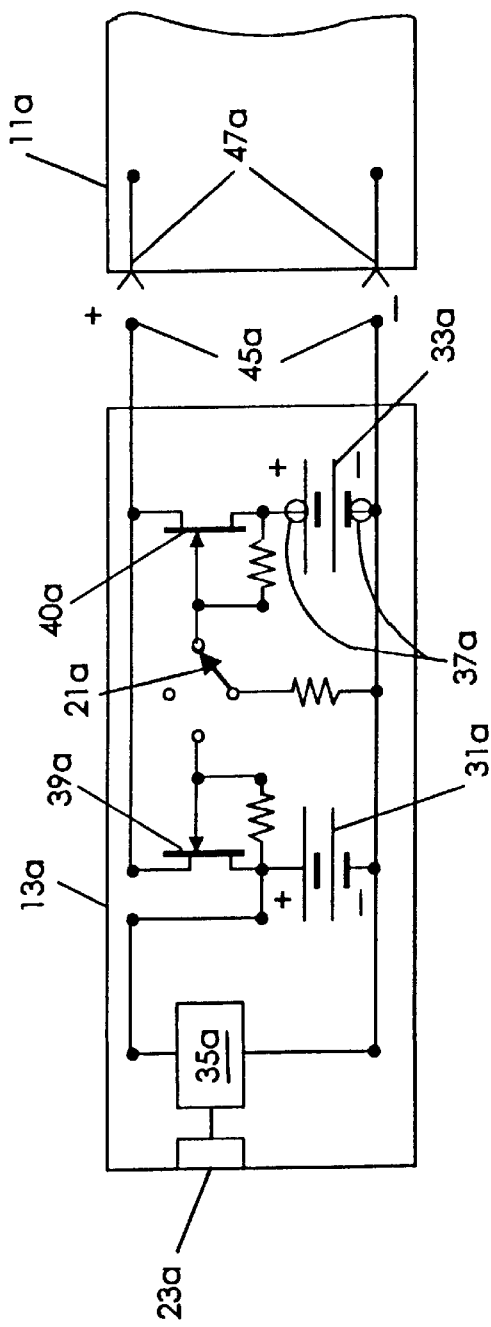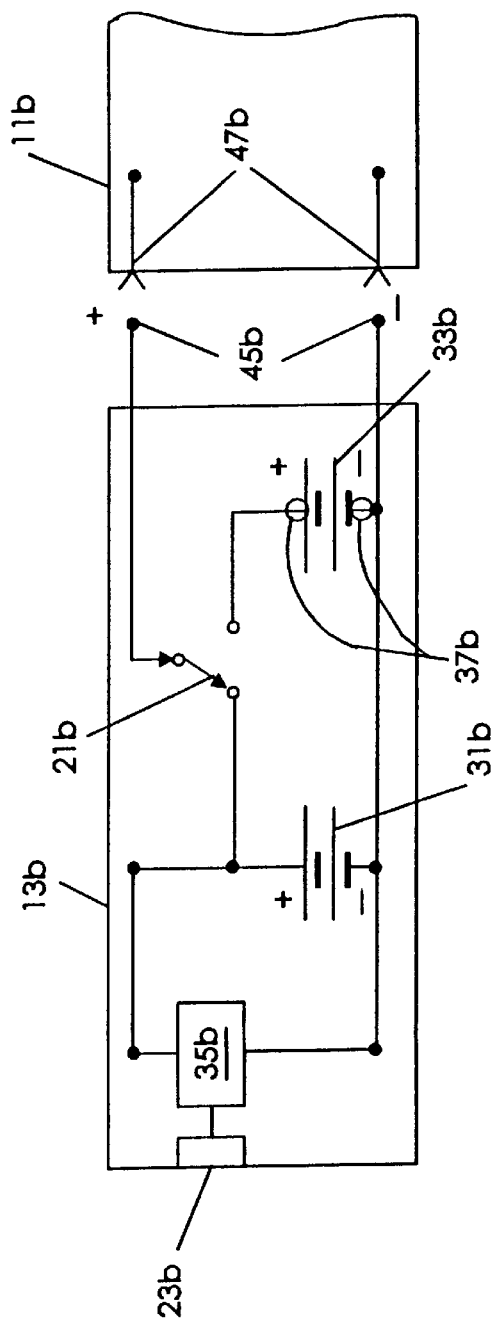

BATTERY PACKS INCLUDING RECHARGEABLE AND NON-RECHARGEABLE BATTERIES AND RELATED SYSTEMS AND METHODS

FIELD OF THE INVENTION

The present invention relates to the field of electronics and more particularly to the field of battery powered electronic devices.

BACKGROUND OF THE INVENTION

Rechargeable batteries are now widely used for many portable electronic devices including laptop computers, "Walkman"® type tape and compact disk players, and cellular radiotelephones. The use of rechargeable batteries allows an electronic device to be used without the need for a plug-in power source. In addition, the rechargeable battery can be recharged and used again when the charge of the rechargeable battery is depleted thereby reducing the expense of purchasing new batteries every time the batteries are depleted. The use of rechargeable batteries is discussed, for example, in U.S. Pat. No. 4,851,756, U.S. Pat. No. 5,418,433, and U.S. Pat. No. 4,667,142.

In particular, rechargeable batteries for use with portable radiotelephones can provide low internal impedance and high storage capacity. These batteries, however, may suffer from self-discharge wherein the rechargeable battery may discharge itself completely within a few weeks even if the radiotelephone has not been used. This self-discharge may be particularly troublesome for casual-use radiotelephone subscribers.

Because of self-discharge, a casual-use subscriber may often find that the battery is dead even though the radiotelephone has not been used since the batteries were last recharged. Carrying a second rechargeable battery may not remedy this problem because the second battery may self-discharge in roughly the same time as the first rechargeable battery. Accordingly, the self-discharge of rechargeable batteries may reduce the usefulness of portable radiotelephones for casual-use subscribers. This problem may increase as the number of casual-use subscribers continues to grow.

Accordingly, there exists a need in the art for battery packs, electronic devices, and methods which reduce problems resulting from the self-discharge of a rechargeable battery.

SUMMARY OF THE INVENTION

It is therefore an object of the present invention to provide improved battery packs, electronic devices, and methods.

It is also an object of the present invention to provide battery packs, electronic devices, and methods that reduce problems resulting from the self-discharge of a rechargeable battery.

These and other objects are provided according to the present invention by a battery pack including first and second battery interfaces which receive first and second batteries, and a switch that connects either the first battery interface or the second battery interface to electrical contacts in response to a selection by a user of the electronic device. Accordingly, if a first one of the batteries is discharged, the user can select the second battery and continue to operate the electronic device being powered by the battery pack. In addition, by requiring user input, the user is made aware that the first battery is discharged allowing the user to recharge or replace the first battery.

More particularly, the battery pack can include a housing separate from the electronic device wherein the housing can be mechanically connected to the electronic device, and electrical contacts on the housing can provide electrical contact with the electronic device when connected thereto. A first battery interface in the housing can receive the first battery, and a second battery interface in the housing can receive the second battery. The switch in the housing connects either the first battery interface or the second battery interface to the electrical contacts in response to a selection by a user of the electronic device.

More particularly, the first battery is preferably rechargeable, and the second battery is preferably non-rechargeable. During normal use, the electronic device is preferably powered using the rechargeable battery thereby reducing the costs of replacing batteries. The first rechargeable battery, however, may be susceptible to self-discharge wherein the rechargeable battery discharges over time without use. The second non-rechargeable battery is preferably less susceptible to self-discharge so that the user is less likely to have two dead batteries. Accordingly, the user can switch to the second non-rechargeable battery when the first rechargeable battery is discharged. Once the rechargeable battery has been recharged, the user can switch back to the rechargeable in battery.

The first rechargeable battery is preferably integrated within the housing while the second non-rechargeable battery can preferably be removed from the housing. Accordingly, the second non-rechargeable battery can be easily removed and replaced with a fresh battery when needed. The first rechargeable battery can be recharged within the battery pack.

The battery pack can also include a charge detection circuit coupled to the first battery interface wherein the charge detection circuit determines a charge of the first rechargeable battery. A charge indicator can be coupled to the charge detection circuit to provide an indication of a charge of the first battery. Accordingly, the user of the electronic device can be warned that the first rechargeable battery is nearly discharged and thus switch operation to the second non-rechargeable battery.

In addition, a manual selector can be provided on the housing coupled to the switch wherein the manual selector provides user input of the battery selection. Furthermore, the manual selector can have a first setting indicating selection of the first battery, and a second setting indicating selection of the second battery. In addition, the manual selector can have a third setting indicating disconnection of both batteries. Accordingly, discharge of the batteries can be reduced when the electronic device is not being used.

The battery pack of the present invention can thus be advantageously used with a radiotelephone. In particular, the battery pack increases reliability of a radiotelephone for casual-use subscribers. In particular, a casual-use subscriber may have sufficiently long intervals between uses so that the rechargeable battery is subject to self-discharge. The casual-use subscriber thus has the benefit of the non-rechargeable battery which may be less susceptible to self-discharge.

According to an alternate aspect of the present invention, a method for providing electrical energy from one of a first and a second battery to a battery powered electronic device including an electrical load is discussed. In particular, a user input is provided indicating a selection of either the first or the second battery. Either the first or second battery is then electrically connected to the electrical load in response to the user input. As before, the first battery is preferably rechargeable, and the second battery is preferably non-rechargeable.

According to the battery packs, systems, and methods of the present invention, problems associated with self-discharge of a rechargeable battery can be reduced.

BRIEF DESCRIPTION OF THE DRAWINGS

FIGS. 3 through 6 are schematic diagrams illustrating battery packs according to the present invention.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
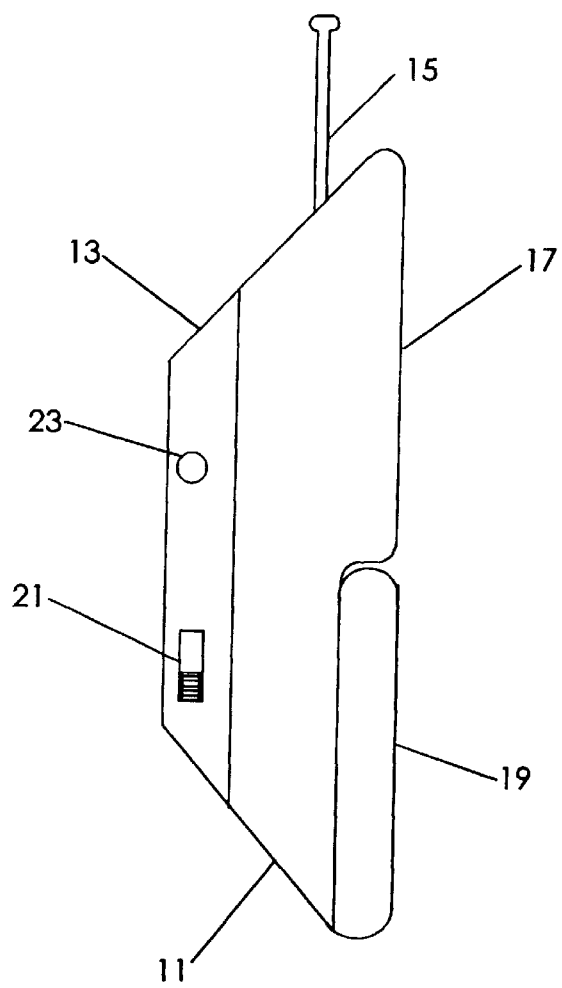
FIGS. 1 and 2 are side views illustrating radiotelephones including a battery pack according to the present invention.

As shown in FIG. 1, a portable radiotelephone may include a body 11 and a battery pack 13 that is separable from the body 11. The body 11 may include an antenna 15, a front face 17, and a key pad cover 19 that covers a keypad when not in use. Moreover, a speaker and a microphone are included on the front face 17 of the radiotelephone body. In addition, the radiotelephone includes a controller and a transceiver within the radiotelephone body 11 coupled with the speaker, microphone, antenna 15, and keypad for transmitting and receiving radio communications to and from a base station or another radiotelephone. In particular, the radio communications can be cellular radiotelephone communications between a cellular radiotelephone and a cellular base station. Furthermore, the base station can be a satellite.

Figure 2:
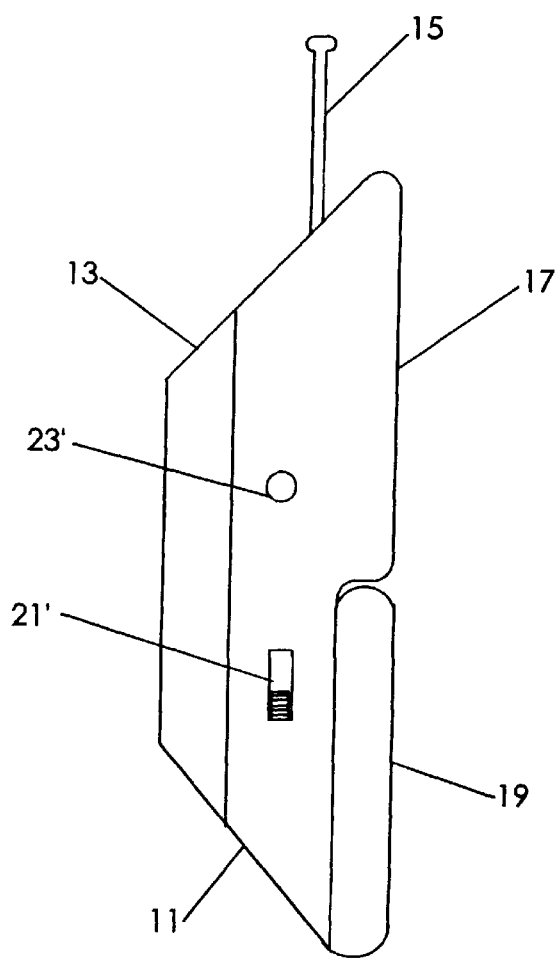

The battery pack 13 includes a first rechargeable battery and an interface for receiving a second non-rechargeable battery, and electrical energy from the battery pack 13 is used to power the radiotelephone. Moreover, a manual selector 21 is used to select either the first rechargeable battery or the second non-rechargeable battery to power the radiotelephone. In addition, an indicator 23 such as a light emitting diode can be used to indicate a low charge condition for the rechargeable battery. Alternately, the manual selector 21' that selects the battery and/or the indicator 23' that indicates a low charge condition for the rechargeable battery can be provided on the radiotelephone body as shown in FIG. 2. Furthermore, the indicator can be provided by using the speaker to produce an audible indication, and the manual selector can be provided through the keypad.

Accordingly, during normal operation, the manual selector 21 can be set to a first position to select the first rechargeable battery to provide electrical power to operate the radiotelephone. When the first rechargeable battery reaches a low charge state, the indicator 23 provides the user with an indication that there is only a minimal charge remaining on the rechargeable battery and that further operation using the rechargeable battery will be limited to a relatively short period of time. The user can thus move the manual selector 21 to a second position to select the second non-rechargeable battery to provide electrical power to operate the radiotelephone until the first rechargeable battery can be recharged. In addition, the user will be informed that the first rechargeable battery needs charging because the selection of the second non-rechargeable battery requires intervention on the part of the user.

The use of the second non-rechargeable battery in the battery pack thus provides a spare battery that is not as susceptible to self-discharge as the first rechargeable battery may be. The first rechargeable battery is intended to be used during normal operation with the second non-rechargeable battery being used during relatively short intervals when the first rechargeable battery is discharged. Once the user is aware that the first rechargeable battery is discharged, he can use the second battery until he can recharge the first rechargeable battery.

Because the first rechargeable battery can be recharged over and over again, the expense of buying new batteries can be reduced. Because the second non-rechargeable battery is less prone to self-discharge, the user is less likely to be caught with a dead battery. Moreover, replacement of the second non-rechargeable battery can be reduced by only using the second non-rechargeable battery for short periods of time when the user is caught with a discharged rechargeable battery.

The battery pack 13 is preferably contained within a housing that is separable from the radiotelephone body 11. In particular, the housing can be mechanically connected to the radiotelephone body, and electrical contacts can provide electrical connection with the radiotelephone body when connected thereto. Accordingly, the battery pack can be removed from the radiotelephone body for recharging the first rechargeable battery, replacing the battery pack, and/or replacing the non-rechargeable battery. Alternately, the rechargeable battery can be recharged while maintaining the battery pack on the radiotelephone body.

First and second battery interfaces in the housing respectively receive the first rechargeable battery and the second non-rechargeable battery. Moreover, the first rechargeable battery is preferably integrated within the housing and the first battery interface, and the second non-rechargeable battery is preferably removable from the second battery interface and the housing. Accordingly, the second non-rechargeable battery can be easily replaced, while the first non-rechargeable battery can be recharged within the housing.

Various battery packs according to the present invention are illustrated schematically in FIGS. 3 through 8. A schematic diagram of a first battery pack 13a is illustrated in FIG. 3. As shown, the battery pack includes a first rechargeable battery 31a, a second non-rechargeable battery 33a, a battery charge detection circuit 35a, a battery charge indicator 23a, and a manual selector 21a such as a switch. Moreover, the switch can include an electronic switching circuit or a mechanical switch.

In particular, the manual selector 21a is used to turn on either the transistor 39a or the transistor 40a. When turned on, the transistor 39a couples the first rechargeable battery 31a with the electrical contacts 45a to provide electrical energy to the radiotelephone 11a. Alternately, the transistor 40a couples the second non-rechargeable battery 33a to the electrical contacts 45a when turned on.

The battery pack 13a can be electrically coupled to the radiotelephone 11a through the electrical contacts 45a of the battery pack and the electrical contacts 47a of the radiotelephone. As will be understood by one having skill in the art, the electrical contacts 45a and 47a provide electrical connections between the battery pack and the radiotelephone when the two are mechanically connected. Preferably, these contacts can be connected and disconnected relatively easily. In addition, the charge detection circuit 35a detects a charge of the rechargeable battery 31a when the transistor 39a is turned on, and the battery charge indicator 23a informs the user when the rechargeable battery reaches a low charge.

Accordingly, the electrical energy is provided from the first rechargeable battery 31a during normal operations, and when the rechargeable battery reaches a low charge, the battery charge indicator 23a gives notice to the user. Accordingly, the user will know that the rechargeable battery needs to be recharged. Alternately, the user will know that the rechargeable battery needs to be recharged when it is completely discharged and the radiotelephone no longer functions. If the user wishes to continue operation of the radiotelephone before recharging the rechargeable battery, the user can move the manual selector 21a to a second position turning the second transistor 40a on and turning the first transistor 39a off. Accordingly, the second non-rechargeable battery 33a is coupled to the electrical contacts 45a thereby providing electrical energy from the second non-rechargeable battery to the radiotelephone 11a.

In addition, the interface for the second non-rechargeable battery 33a includes the insertion/removal contacts 37a that allow the second non-rechargeable battery 33a to be removed from the battery pack and replaced with another battery. Accordingly, when the non-rechargeable battery reaches a low charge state, the non-rechargeable battery can be replaced. As shown, the first rechargeable battery 31a can be integrated in the battery pack so that it cannot be easily removed.

Figure 5:
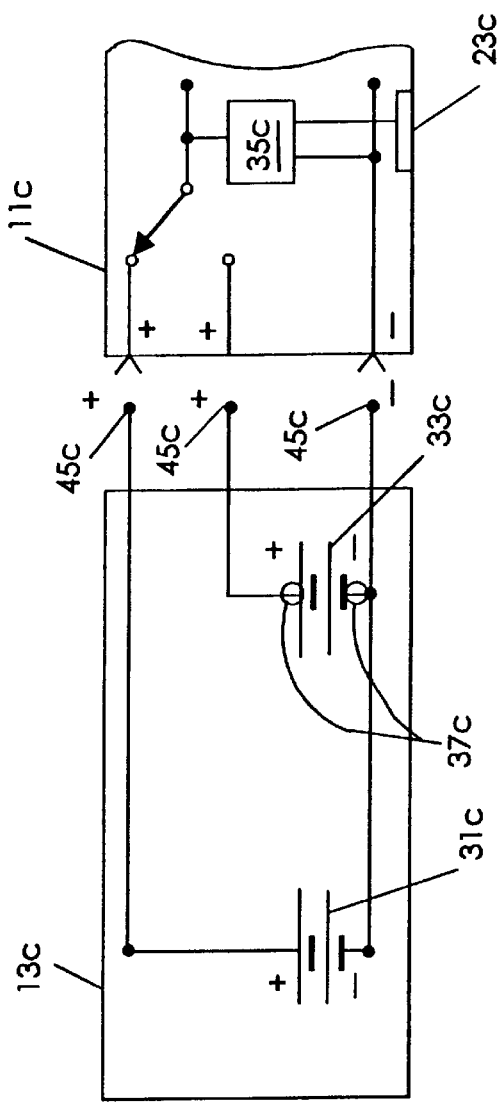

The battery pack 13b of FIG. 4 is similar to the battery pack 13a of FIG. 3 with the exception that the manual selector 21b directly couples either the first rechargeable battery 31b or the second non-rechargeable battery 33b to the electrical contacts 45b. In other words, the battery pack 13b does not include the transistors of FIG. 3. The battery pack 13c of FIG. 5 is similar to that of FIG. 3 with the exception that the manual selector 21c, the charge detection circuit 35c, and the battery charge indicator 23c are included in the radiotelephone 11c.

Figure 6:
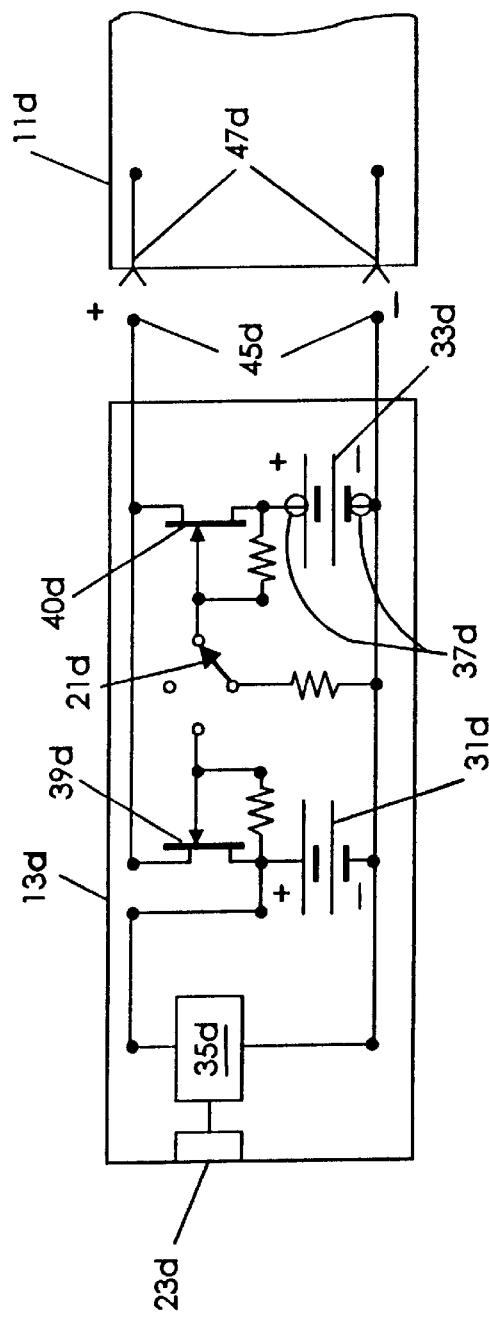

The battery packs 13d of FIG. 6 is similar to the respective battery pack 13a of FIG. 3 with the exception that the battery packs 13d has a respective manual selector 21d with three positions. Accordingly, the manual selector can either couple the first rechargeable battery to the electrical contacts, couple the second non-rechargeable battery to the electrical contacts, or decouple both batteries from the electrical contacts. By decoupling both batteries, undesired leakage from the batteries can be reduced thereby increasing the life of the batteries.

The battery packs, systems, and methods of the present invention thus reduce the inconvenience associated with the self-discharge of rechargeable batteries. In particular, a second non-rechargeable battery is used as a backup to a first rechargeable battery. The second non-rechargeable battery is less susceptible to self-discharge. Accordingly, if the first rechargeable battery has self-discharged, the second non-rechargeable battery can be used to power the radiotelephone until the first rechargeable battery can be recharged.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A battery pack for an electronic device, said battery pack comprising:

a housing separate from the electronic device wherein said housing can be mechanically connected to the electronic device;

electrical contacts on said housing wherein said electrical contacts provide electrical contact with the electronic device when connected thereto;

a first battery interface in said housing wherein said first battery interface receives a first battery;

a second battery interface in said housing wherein said second battery interface receives a second battery; and a switch in said housing wherein said switch connects either said first battery interface or said second battery interface to said electrical contacts in response to a selection by a user of the electronic device.

2. A battery pack according to claim 1 wherein the first battery is rechargeable and the second battery is non-rechargeable.

3. A battery pack according to claim 2 wherein the first battery is integrated within said housing and wherein the second battery can be removed from said housing.

4. A battery pack according to claim 2 further comprising:

a charge detection circuit coupled to said first battery interface wherein said charge detection circuit determines a charge of the first rechargeable battery; and a charge indicator coupled to said charge detection circuit wherein said charge indicator provides an indication of a charge of said first battery.

5. A battery pack according to claim 1 wherein said housing is separable from the electronic device.

6. A battery pack according to claim 1 further comprising a manual selector on said housing coupled to said switch wherein said manual selector provides user input of a battery selection.

7. A battery pack according to claim 6 wherein said manual selector has a first setting indicating selection of the first battery, and a second setting indicating selection of the second battery.

8. A battery pack according to claim 7 wherein said manual selector has a third setting indicating the disconnection of both batteries.

9. A battery powered electronic device comprising:

a first battery interface wherein said first battery interface receives a first battery;

a second battery interface wherein said second battery interface receives a second battery;

an electrical load; and a switch wherein said switch connects either said first battery interface or said second battery interface to said electrical load in response to a selection by a user of the electronic device.

10. A battery powered electronic device according to claim 9 wherein said first and second battery interfaces are contained in a common battery housing separable from said battery powered device and wherein said first and second battery interfaces comprise separable electrical connections between the common battery housing and said switch wherein said switch is outside the common battery housing.

11. A battery powered electronic device according to claim 9 wherein the first battery is rechargeable and the second battery is non-rechargeable.

12. A battery powered electronic device according to claim 11 further comprising:

a charge detection circuit coupled to said first battery interface wherein said charge detection circuit determines a charge of the first rechargeable battery; and a charge indicator coupled to said charge detection circuit wherein said charge indicator provides an indication of a charge of the first battery.

13. A battery powered electronic device according to claim 9 further comprising a manual selector on said electronic device coupled to said switch wherein said manual selector provides user input of a battery selection.

14. A battery powered electronic device according to claim 9 wherein said manual selector has a first setting indicating selection of the first battery, and a second setting indicating selection of the second battery.

15. A battery powered electronic device according to claim 14 wherein said manual selector has a third setting indicating the disconnection of both batteries.

16. A battery pack for a radiotelephone including a transceiver for transmitting and receiving radio communications to and from a radio base station, said battery pack comprising:
   a housing separate from the radiotelephone wherein said housing can be mechanically connected to the radiotelephone;
   electrical contacts on said housing wherein said electrical contacts provide electrical contact with the radiotelephone when connected thereto;
   a first battery interface in said housing wherein said first battery interface receives a first battery;
   a second battery interface in said housing wherein said second battery interface receives a second battery; and
   a switch in said housing wherein said switch connects either said first battery interface or said second battery interface to said electrical contacts in response to a selection by a user of the radiotelephone.

17. A battery pack according to claim 16 wherein the first battery is rechargeable and the second battery is non-rechargeable.

18. A battery pack according to claim 17 wherein the first battery is integrated within said housing and wherein the second battery can be removed from said housing.

19. A battery pack according to claim 17 further comprising:
   a charge detection circuit coupled to said first battery interface wherein said charge detection circuit determines a charge of the first rechargeable battery; and
   a charge indicator coupled to said charge detection circuit wherein said charge indicator provides an indication of a charge of said first battery.

20. A battery pack according to claim 16 wherein said housing is separable from the electronic device.

21. A battery pack according to claim 16 further comprising a manual selector on said housing coupled to said switch wherein said manual selector provides user input of a battery selection.

22. A battery pack according to claim 21 wherein said manual selector has a first setting indicating selection of the first battery, and a second setting indicating selection of the second battery.

23. A battery pack according to claim 22 wherein said manual selector has a third setting indicating the disconnection of both batteries.

24. A battery powered radiotelephone comprising:
   a transceiver wherein said transceiver transmits and receives radio communications to and from a radio base station;
   a first battery interface wherein said first battery interface receives a first battery;
   a second battery interface wherein said second battery interface receives a second battery;
   a switch wherein said switch connects either said first battery interface or said second battery interface to said transceiver in response to a selection by a user of the electronic device.

25. A battery powered radiotelephone according to claim 24 wherein said first and second battery interfaces are contained in a common battery housing separable from said radiotelephone and wherein said first and second battery interfaces comprise separable electrical connections between the common battery housing and said switching circuit wherein said switching circuit is outside the common battery housing.

26. A battery powered radiotelephone according to claim 24 wherein the first battery is rechargeable and the second battery is non-rechargeable.

27. A battery powered radiotelephone according to claim 26 further comprising:
   a charge detection circuit coupled to said first battery interface wherein said charge detection circuit determines a charge of the first rechargeable battery; and
   a charge indicator coupled to said charge detection circuit wherein said charge indicator provides an indication of a charge of the first battery.

28. A battery powered radiotelephone according to claim 24 further comprising a manual selector on said radiotelephone coupled to said switch wherein said manual selector provides user input of a battery selection.

29. A battery powered radiotelephone according to claim 24 wherein said manual selector has a first setting indicating selection of the first battery, and a second setting indicating selection of the second battery.

30. A battery powered radiotelephone according to claim 29 wherein said manual selector has a third setting indicating the disconnection of both batteries.

31. A battery powered electronic device which receives battery power from a battery housing separable from the battery powered device wherein the battery housing includes a first battery interface that receives a first battery and a second battery interface that receives a second battery, the battery powered electronic device comprising:
   an electrical load;
   a coupling that receives the battery housing wherein the coupling includes first and second separable connections that provide electrical coupling to the respective first and second battery interfaces of the battery housing when the battery housing is received in the coupling; and
   a switch wherein said switch connects either the first separable connection or the second separable connection to said electrical load in response to a selection by a user of the electronic device.

32. A battery powered electronic device according to claim 31 wherein the first battery is rechargeable and the second battery is non-rechargeable.

33. A battery powered electronic device according to claim 32 further comprising:

a charge detection circuit coupled to said first separable connection wherein said charge detection circuit determines charge of the first rechargeable battery when the battery housing is received in the coupling; and a charge indicator coupled to said charge detection circuit wherein said charge indicator provides an indication of a charge of the first battery when the battery housing is received in the coupling.

34. A battery powered electronic device according to claim 31 further comprising:

a manual selector on said electronic device coupled to said switch wherein said manual selector provides user input of a battery selection.

35. A battery powered electronic device according to claim 34 wherein said manual selector has a first setting indicating selection of the first battery, and a second setting indicating selection of the second battery.

36. A battery powered electronic device according to claim 35 wherein said manual selector has a third setting indicating the disconnection of both batteries.

* * * * *